June 3, 1958  A. G. LOOFBOURROW  2,837,167
POWER STEERING MECHANISM OF THE HYDRAULIC TYPE
Filed Nov. 10, 1953  4 Sheets-Sheet 1

INVENTOR.
Alan G. Loofbourrow
BY
Harness and Harris
ATTORNEYS.

June 3, 1958  A. G. LOOFBOURROW  2,837,167
POWER STEERING MECHANISM OF THE HYDRAULIC TYPE
Filed Nov. 10, 1953  4 Sheets-Sheet 3

INVENTOR.
Alan G. Loofbourrow
BY
Harness and Harris
ATTORNEYS.

June 3, 1958     A. G. LOOFBOURROW     2,837,167
POWER STEERING MECHANISM OF THE HYDRAULIC TYPE
Filed Nov. 10, 1953     4 Sheets-Sheet 4

INVENTOR.
Alan G. Loofbourrow.
BY
Harness and Harris
ATTORNEYS

United States Patent Office 2,837,167
Patented June 3, 1958

2,837,167
POWER STEERING MECHANISM OF THE HYDRAULIC TYPE

Alan G. Loofbourrow, Bloomfield Hills, Mich., assignor to Chrysler Corporation, Highland Park, Mich., a corporation of Delaware Application November 10, 1953, Serial No. 391,209

29 Claims. (Cl. 180—79.2)

The present invention relates to power boosters and more particularly to hydraulic power steering mechanisms for wheeled vehicles or the like.

This invention forms a continuation-in-part of the invention disclosed in prior application Serial No. 307,811, filed September 4, 1952 now abandoned.

The power steering mechanism of the present invention like other mechanisms which are already generally known in the art, is effective to supplement the manual steering effort required to motivate the steering linkage and dirigible wheels of an automotive vehicle or the like. In the present instance, the power assist which is obtained in producing a directional variation of the dirigible vehicle wheels may be approximately 80% of the total required effort.

One of the several unique features of the present invention, as disclosed in the present embodiment, resides in the provision of a novel means for obtaining a "feel back" which is transmitted to the manually actuated portion of the mechanism, said "feel back" enabling the operator of the vehicle to experience a resistance to directional variation of the vehicle wheels. This resistance is obtained by means of a fluid pressure reaction upon a manually actuated portion of the mechanism and, according to the preferred embodiments of the invention, is proportional to variations in this fluid pressure.

The mechanism further includes a fluid pressure actuated power element and the motivating fluid therefor is caused to undergo pressure variations which are proportional to the resistance offered by the dirigible vehicle wheels to angular movement about a vertical axis. This variation in the motivating fluid pressure causes a corresponding variation in the pressure reaction above referred to thereby providing a conventional and normal steering sensation.

According to another of the disclosed embodiments another of the hydraulic pressures in the system may be utilized to react upon a manually actuated portion of the mechanism thereby obtaining a resistance to directional variation of the vehicle wheels which is proportional to this other pressure.

The pressure actuated power element may comprise a working cylinder and a piston movable therein. The piston may be operatively joined to the usual wheeled vehicle steering linkage to actuate the same and it may include a suitable valve control element operatively associated therewith for controlling the application of motivating fluid pressures to alternate sides of the piston.

The valve element may be adapted to be manually actuated by the operator of the vehicle by providing a suitable mechanical connection between the same and the conventional steering wheel usually located in the passenger compartment of the vehicle. The operator of the vehicle is thereby enabled to both selectively control the magnitude of the motivating fluid pressures and to selectively apply the same to either side of the piston for movement of the steering linkage in alternate directions.

The power element may be supplied with motivating fluid from a suitable source such as an engine driven pump, an accumulator or the like.

The present invention is further characterized by its unique physical construction which may be designated as being unitary or concentric. The control valve element may be axially and concentrically disposed within the piston of the power element.

The steering mechanism herein disclosed may be referred to as being of the open valve type by virtue of the continuously flowing fluid circuit extending in part from the aforementioned pressure source to the piston of the power element and then through the control valve element. The circuit may further include a fluid reservoir which may receive the fluid leaving the control valve element. This continuous circuit is substantially uninterrupted when the vehicle steering linkage is in the straight ahead or neutral position. Upon manual actuation of the control valve element, the flow through the continuous circuit is at least partially constricted by the valve element thereby causing a pressure buildup on either side of the piston.

Another feature of the present invention resides in the provision of a mechanical connection between the operator-controlled steering wheel and this steering linkage upon a failure of the power assist mechanism to function. Such a connection may consist of a suitable lost motion joint. Under normal operating conditions the slack in the lost motion joint will not be entirely taken up since the relative movement between the component parts thereof will be accompanied by a simultaneous movement of the control valve element with respect to the piston thereby causing the piston to move under the resulting pressure build-up on one side thereof and to follow up the movement of lost motion joint.

In the unitary steering mechanism such as that presently disclosed, the lost motion joint is preferably located for convenience in manipulation and for ease in adjustment at a point external to the power element and control valve and in the direct line of motion of the piston.

An object of the present mechanism is to provide a power steering mechanism including a fluid power booster element, a manually actuated piston, and a fluid tight lost motion joint interconnecting the same, the lost motion joint including movable members which are acted upon by a suitable pressure from the fluid circuit for the steering mechanism to obtain a sense of feel or pressure reaction upon the manually actuated piston.

Another object is to provide a concentric unitary power steering gear having a lost motion joint of the type previously described which includes a spring interposed between the movable elements to supplement the fluid pressure reaction.

Another object of the present invention is to provide a power steering mechanism having a fluid working piston, a control valve mechanism concentrically disposed therein and a lost motion connection between a manually operable element of the mechanism and the piston, said connection being effective to transmit an operating motion to the control valve mechanism.

Another object of the present invention is to provide a power steering mechanism of the type described in the preceding object wherein the control valve is maintained in a state of substantial hydraulic balance irrespective of the operating position in which it is moved.

Another object of the present invention is to provide a power steering mechanism of the type above referred to in which the resistance to the steering effort as determined by the hydraulic pressure reaction is equal for movement of the control valve in either of two opposite directions.

Further features, objects and advantages will become apparent from the following description and the accompanying drawings in which:

Figure 8 is an enlarged view of a portion of still another modified form of the power steering unit of Figure 1.

Figure 1:
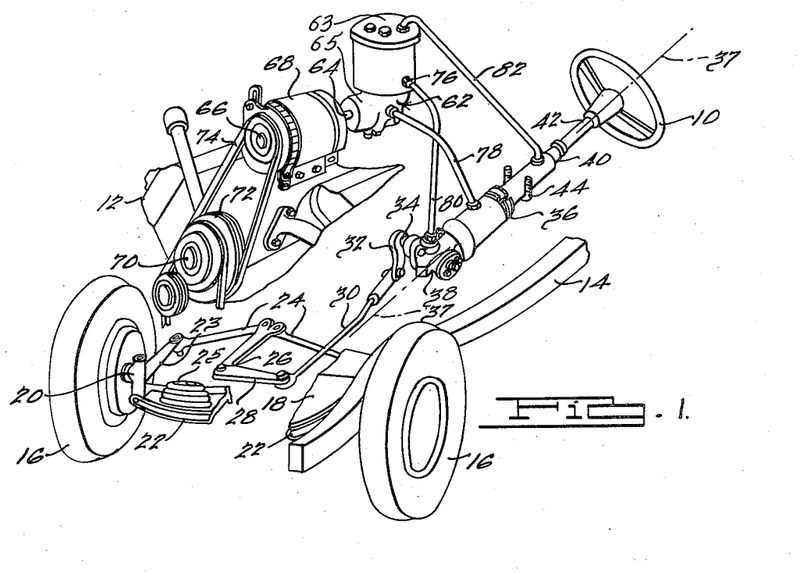
Figure 1 is a perspective view of the components of a vehicle steering mechanism including the power assist elements of the present invention.

Having reference first to Figure 1, portions of the front end of a conventional automotive vehicle are shown including a manually actuated steering wheel 10, a propulsion power plant 12, a body supporting frame 14 and running gear for suspending the vehicle. This running gear includes a pair of steerable front wheels 16 which are supported from a cross member 18 forming a portion of the vehicle frame 14.

Each wheel of the pair of wheels 16 is incorporated in a so-called independent front end suspension which includes a set of one or more vertically spaced arms 22, a wheel spindle and knuckle support 20 articulately connected to the outer ends of the arms 22, a spring 25 disposed between each of the lower arms 22 and the frame cross member 18, and a steering arm 23 for each of the front wheels 16.

Each of the steering arms 23 has an inwardly directed tie rod 24 connected thereto, the relatively inner ends of which are pivotally connected to one arm of a bellcrank 28 which is pivotally supported to swing about a pivot 26 affixed to the frame front cross member 18. A rearwardly extending drag link 30 is pivotally connected at the front to the other arm of the bellcrank 28 and is supported at its rear end by a pitman arm 32 splined to a transversely disposed rockshaft 34. It is through the rockshaft 34 and associated linkage just described that the steering mechanism of the steered vehicle is connected to the pair of front wheels 16.

A multi-section steering casing is shown at 36 and it has a longitudinal axis 37. The casing 36 is generally longitudinally elongated in shape between its lower and upper ends indicated at 38 and 40 respectively. The lower end 38 of the casing 36 receives the rockshaft 34 which is journalled therein by means of bearings so as to be generally transversely arranged with respect to the longitudinal axis 37 of the casing 36. The upper end 40 of the casing 36 receives a steering column 42 which is arranged concentrically therewith along the axis 37. The steering column 42 supports the steering wheel 10 and houses a steering shaft later to be described.

An insulated support bracket 44 of general U-shape is provided so as to mount the casing 36 to the instrument panel and dash board structure of the vehicle, not shown. The multi-section casing 36 contains a valve-controlled piston which combines therewith to form a fluid-supplied power motor which is used in a power steering unit to apply power to operate the steering mechanism of the vehicle.

The power steering unit has a source of fluid pressure generally indicated at 62 and is positively driven by a pump shaft 64 flexibly coupled in tandem to a generator shaft 66 which drives the rotor of a generator 68. The propulsion power plant 12 selected for illustration in Figure 1 is a V-8 engine to which the generator 68 is mounted, and the engine includes a water pump shaft 70 which is belt-driven from the engine and which has a sheave 72 keyed thereto. By means of a V belt 74, the sheave 72 is connected to a corresponding sheave on the generator shaft 66 and thereby positively drives the pump shaft 64 at speeds directly poroportional to engine speed. Thus as the speed of the power plant 12 varies, the shaft speed of the generator 68 and the shaft speed of the drive shaft 64 for the source of pressure 62 will both vary correspondingly.

The source 62 includes a reservoir 63 which is adapted to supply a pump shown at 65, said pump 65 being effective to increase the fluid pressure to a value up to 600 to 800 p. s. i. The pressurized fluid is then transmitted through a supply pipe 78 to the steering unit casing 36. The pressure system used herein is preferably of the re-circulating type and thus a return line 80 is provided for returning the pressure fluid from the lower end 38 of the casing 36 to a filter container inlet 76 on the reservoir 63 of the pressure fluid source 62.

A seepage line 82 is provided between the upper end 40 of the casing 36 and the top of the reservoir tank at the source of pressure fluid 62.

In the power steering unit of Figures 2, 3, 4, and 5, the multi-section casing 36 is seen to comprise a one-piece lower casing part 84 and a one-piece upper part 86, these casing parts being secured together by a nut 88 having an inwardly directed flange at one end thereof and a set of internal threads at the other end. The upper end 40 of the upper casing part 86 is received within a flare formed in the lower end of the steering column 42 and is held in place by a clamping band 90. The steering column 42 contains an impregnated fabric bearing 92 formed of a yieldable material which slidably receives and journals a transmission ratio selector shaft 94 so that the shaft 94 is both rotatably and axially shiftable.

Figure 2:
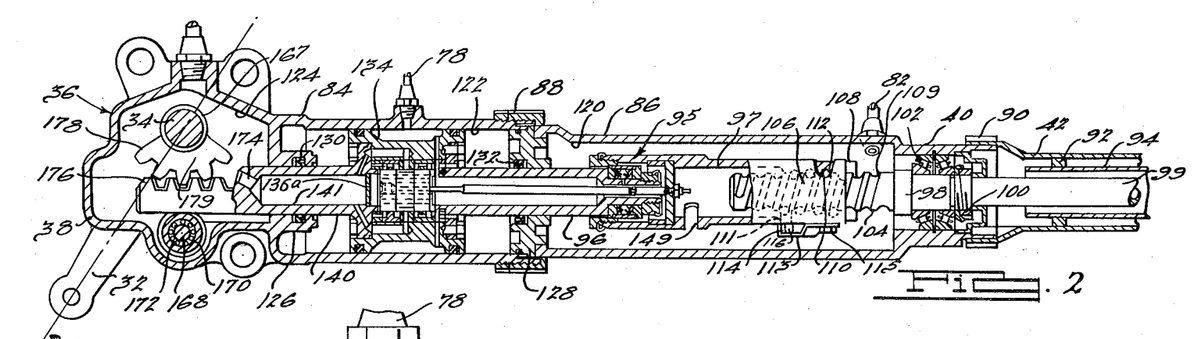
Figure 2 is a longitudinal sectional view of the power steering unit of the vehicle in Figure 1.

The elongated casing 36 receives a pair of axially aligned shafts, one of which is formed of a two-piece construction comprising a hollow tubular piston rod portion 96 and a tubular nut portion 97, and the other shaft of which is a tubular steering shaft 99 rotatably connected at its upper end to the steering wheel 10. The rod portion 96 is connected to the nut portion 97 by means of a lost motion joint 95.

The steering shaft 99 is concentrically arranged within a hollow ratio selector shaft 94. Both the steering shaft 99 and the selector shaft 94 are rotatable about their common axis. The shaft 99 is provided with a fixed shoulder 98 which is positioned in axially spaced relationship with respect to a nut 100 threadably received on the steering shaft 99. Surrounding the shaft 99 and received in the space between the shoulder 98 and the nut 100, a span of tapered roller bearings 102 is provided which rotatably holds the shaft 99 against any axial movement.

A worm 104 is formed on the lower end of the steering shaft 99 and is received within a worm nut 106 which is arranged concentrically therewith and integrally incorporated in the tubular nut portion 97. The lateral sides of the worm nut 106 are flat and they are adapted to engage a set of opposed flat inwardly directed cheeks 108 formed on the inner surface of the upper casing part 86 which provide a trackway for the worm nut 106 and prevent any rotary motion of the latter. The worm nut 106 incorporated in the tubular nut portion 97, while being prevented from rotation by means of the cheeks 108, is nevertheless slidable longitudinally inside the upper casing part 86. The respective outer and inner peripheries of the worm 104 and the nut 106 are provided with a pair of single pitch grooves 109 and 110, respectively, having a corresponding pitch and containing a continuous series of balls 112.

Provision is made for a return channel or ball conveyor by boring a hole from one side of the worm nut 106 to an intersection with the thread of the nut at two spaced locations on the nut so as to span exactly 2½ of the single pitch threads thereof. These holes, one of which is indicated at 111, are counterbored to receive a ball conveyor which defines an inner bore of such size which will permit the balls to pass radially therethrough, said conveyor being secured to the worm nut 106 by means of a bracket 113 and a set of screws 115. The ball conveyor comprises convenable semi-cylindrical sections 114 and 116 and is located in the bracket 113 so that the sections are held in a companion mating relationship with respect to each other. Each of the semi-cylindrical sections 114 and 116 has a lip at one extremity thereof which is seated in the groove 109 of the worm 104 and which is inclined forwardly so as to scoop up the balls out of the groove.

The upper casing part 86 and the lower casing part 84 combine to provide a series of longitudinally successive chambers 120, 122 and 124. The chamber 120, disposed wholly within the upper casing part 86, serves as a seepage or fluid collecting chamber which communicates directly with the reservoir of the pressure fluid source 62, Figure 1, by means of the seepage pipe 82. The chamber 124, which serves as a fluid return chamber, is separated by means of a transverse partition 126 from the chamber 122, which latter provides a working cylinder formed in the lower casing part 84. The working cylinder 122 is in turn separated from the seepage collecting chamber 120, formed in the upper casing part, by means of another transversely disposed partition 128 which necessarily has a spaced-apart relationship with respect to the previously mentioned partition 126.

The transversely disposed partition 128 is secured in the bridging structure between the casing parts 84 and 86, and is held in place by means of the nut 88. Each of the spaced-apart transverse partitions 126 and 128 contains a lipped seal, shown at 130 and 132 respectively, said seals preferably being formed of synthetic rubber the lips for each seal extending in an axially inward direction.

The working cylinder 122 slidably receives a pressure movable, double-acting passaged piston member 134 for reciprocative movement therein which divides the cylinder 122 into two working chambers 131 and 133, one at each end of the piston 134. The piston 134 incorporates a pair of end structures 136 and 138 providing a pair of oppositely extending hollow piston rods, one of which is constituted by the tubular piston rod portion 96 integrally secured to the piston end structure 138. The other tubular piston rod 140 is integrally secured to the piston end structure 136 and has its hollow interior 141 partitioned from the interior of the piston 134 by an end closure portion 136a.

The hollow piston rod 96 contains a valve-operating rod 144 of relatively small diameter which is connected at its inner end by a nut 145 to a spool-type control valve 146, and which is threaded at its outer end 148 so as to threadably engage a transversely disposed blank or plate element 150. The element 150 is received within the tubular nut portion 97 adjacent a transverse circumferentially extending slot 149 through the side of the nut portion 97. The extreme end of the threaded rod portion 148 is non-circular in cross section at 151 and is disposed adjacent the tool opening or slot 149 so as to receive an adjusting tool by means of which the valve-operating rod 144 is threadably adjusted with respect to the element 150.

A locknut 152 is received on the threads 148 for locking the valve-operating rod 144 relative to the plate element 150 and the nut portion 97. When the steering shaft 99 is rotated, the rotary motion thereof is converted into a reciprocating motion of translation by means of the worm and worm nut 104 and 106 respectively, and such motion of translation is in turn imparted to the tubular piston rod portion 96 and to the valve-operating rod 144 by reason of the lost motion joint 95 between rod portion 96 and nut portion 97.

The tubular piston rod portion 96 has a shoulder 154 which is opposed by a nut 156 threadably received on the end of the piston rod 96. In the space between the shoulder 154 and the nut 156, a pair of lost motion elements 158 is provided which surround a reduced diameter end portion of the tubular piston rod portion 96. The lost motion elements 158 are spaced apart at all times a distance equal at least to the length of a spacer sleeve 161 and normally the lost motion elements are at a somewhat greater distance apart so as to form one or more included gaps 160 between the spacer sleeve 161 and the respective lost motion elements 158. It will be perceived that the relatively inner surface of the lost motion elements 158 and the spacer sleeve 161 define a cylindrical volume of revolution having relatively movable walls at the respective ends thereof constituted by the plunger-like elements 158.

Figure 3:
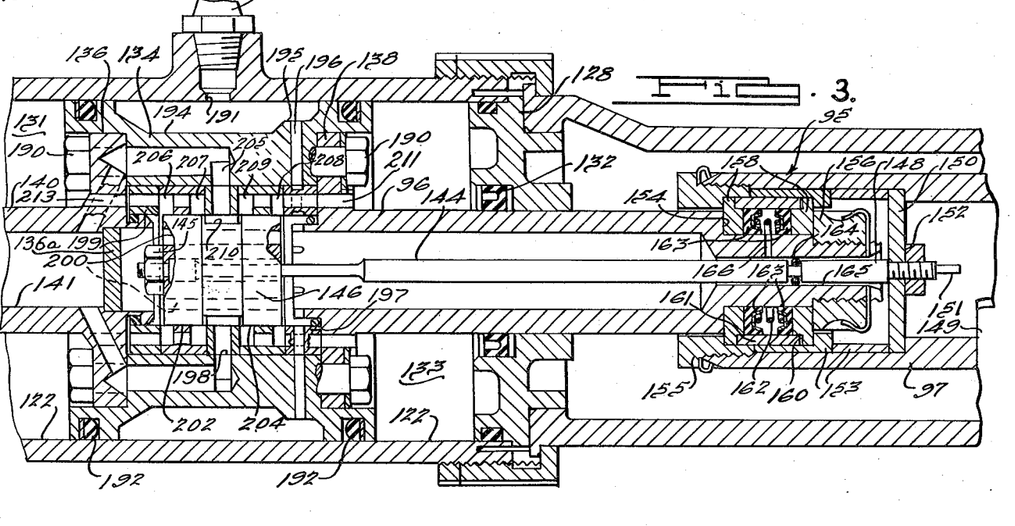
Figure 3 is an enlarged sectional view of a portion of the power steering unit of Figure 2.
Figures 4, 5:
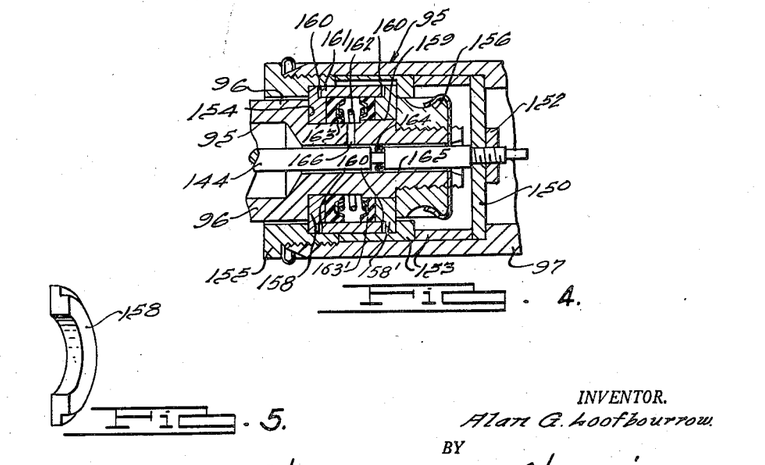
Figure 4 is an enlarged sectional view of a portion of a modified form of the present invention.
Figure 5 is a perspective detail view of one of the structural elements of Figure 4.

In the embodiments of Figures 3, 4, and 5, the outer portions of the transverse surfaces of the lost motion elements 158 are engaged by a nut 155 threadably received in the tubular nut portion 97 and by an adjacent one of a pair of spacer elements 153. The spacer elements 153 are also effective to clamp the blanking element 150 against a shoulder in the tubular nut portion 97. The inner portion of the transverse surfaces of the lost motion elements 158 are engaged by the shoulder 154 and by the nut 156 carried by the tubular piston rod portion 96. Thus as the tubular nut portion 97 reciprocates in either axial direction, one or the other of the lost motion elements 158 is moved in the direction of the other lost motion element 158 so as to tend to close up the gap or gaps 160. A spring 162 may be provided between the elements 158, if desired, to bias the same away from each other.

If the reaction thrust of the tubular piston rod portion 96 happens to be substantial, the gap 160 is entirely closed up and a direct drive connection results between the tubular nut portion 97 and the hollow piston rod portion 96 through the lost motion connection 95. On the other hand, a direct drive connection is always present between the tubular nut portion 97 and the valve-operating rod 144 so that the valve 146 responds to very movement of translation of the tubular nut portion 97.

A hollow interior of the tubular piston rod portion 96 communicates with a reduced diameter bore 165 at one end of the latter. An O-ring-type seal 164 carried by the valve-operating rod 144 is received in the bore 165. At a location in the bore 165 intermediate the valve 146 and the operating rod seal 164, one or more transverse passages 166 are provided which communicate at their outer ends with the space forming the previously noted cylindrical volume of revolution between the lost motion elements 158 containing the spring 162. The spring 162 thrusts against a pair of spring seats, each of which is carried by plunger-like deformable seals 163 which are generally channel-shaped in cross section. The seals 163 may be formed of yieldable rubber, elastic resin, plastic, or other elastomeric material.

In the embodiment of Figure 3, the seals 163 and the lost motion elements 158 are identical to one another, whereas in the embodiment of Figure 4, the right hand sealing element identified by reference numeral 163' has a relatively large inside diameter in order to ride suitably on a slightly enlarged shoulder portion 159 provided on the tubular piston rod portion 96. The lost motion element on the right hand side, as viewed in Figure 4 and identified by reference numeral 158', also has a slightly larger inside diameter than the opposite lost motion element 158 in order to ride suitably on the same shoulder 159. For reasons of assembly, the left hand lost motion element 158 in the embodiment of Figure 4 is diametrically split and results in a two-piece construction, each piece thereof being identical and generally as shown at 158 in Figure 5.

The present steering unit is designed for the purpose of providing a power boost action such that when the valve 146 is moved from its neutral relative position, a pressure differential is caused to be exerted across the double acting piston 134 and the piston is designed to move in the direction of the displacement of the valve 146 with a resulting valve neutralizing or followup motion. In the event of the failure of the pressure fluid system, a direct mechanical thrust is transmitted to the piston 134 through the lost motion joint 95 and the tubular piston rod portion 96 of the two-piece shaft containing the lost motion joint 95. In such event the piston is likewise moved in a direction tending to follow, but somewhat lagging, the movement of the valve 146. Under all operating conditions, however, the motion of the piston 134 may be transmitted to the tubular piston rod 140.

It will be noted that the lip seal 132 engages the outer surface of the tubular piston rod portion 96 and has the lip thereof so directed as to be disposed in the direction of movement of the tubular piston rod portion 96 at all times during which a substantial fluid pressure is manifested acting against the end structure 138 of the double acting piston 134. The lip seal 130 is similarly directed with respect to the tubular piston rod 140. The hollow interior 141 of the tubular piston rod 140 conducts fluid being exhausted from the motor through the valve 146 in a manner subsequently to be described and past an opening 174 formed in the piston rod 140 so as to discharge the returned fluid into the return chamber 124. The rockshaft 34 to which the depending pitman arm 32 is splined, is journalled in a set of transversely disposed bearings, one of which is shown at 167, said bearings providing a straddle-type mounting for the rockshaft 34. The countershaft 168 is disposed in transverse alignment with the rockshaft 34 and is contained in the same transverse plane therewith.

A peripherally grooved roller 170 is mounted on a set of needle bearings 172 which are supported by the countershaft 168 as a journal. A set of rack teeth 176 is formed on the end of the tubular piston rod 140 outwardly of the return opening 174, the end of the piston rod 140 being of a generally semi-circular cross section. The rack teeth 176 may be formed with appropriate gear characteristics so that they will operatively mesh with the involute teeth 178 formed on a tapered gear sector 179.

The arcuate surface of the semi-circular end of the piston rod 140 is supportedly received in the peripheral groove of the roller 170, and the lateral thrusts to which the rod 140 is subjected are taken up by the reaction on the roller 170.

The rockshaft 34 with which the gear sector 179 is integral, is shiftably adjustable along its own axis so that the teeth 178 of the tapered sector 179 and the rack teeth 176 may be wedged into a close and intimate engagement with one another thereby causing a minimum of operating backlash.

The body portion of the piston 134 has the respective end structures 136 and 138 individually fastened thereto by means of one or more bolts 190. Spaced peripheral grooves are formed near each axial end of the piston body portion 134, said grooves each receiving a piston ring structure 192 which sealingly engages the walls of the working cylinder 122. The body of the piston 134 has a main annular recess 194, which is long enough axially of the piston to permit an end port 191 for the supply pipe 78 to be continually in communication with the main annular recess 194 as the piston moves from one axial position to another. The floor of the annular recess or groove 194 at one end thereof has one or more radial passages 196, each of which communicates with the previously noted supply pipe port 191 through a port 195. The radial passages 196 extend radially inwardly through the piston 134 and through an annular valve element 197 to a hollow interior 198 formed in the piston 134. The annular valve element 197 is secured to piston 134 within the interior 198 and is in juxtaposition with the outer periphery of the rod portion 96, as shown.

The hollow interior 198 of the piston 134 communicates with the radial space between the valve-operating rod 144 and the tubular piston rod portion 96 so as to communicate with the bore 165 and the transverse passage 166 which lead into the space between the seals and lost motion elements 163 and 158.

The valve 146 is freely movable within the hollow interior 198 of the piston 134 and has one or more longitudinally extending passages 200 therethrough which establish free communication from one end of the interior 198 of the piston to the other. The valve 146 is a spool-type valve and has an annular groove 210 at a mid portion thereof and a set of end lands 202 and 204 provided at the respective ends thereof.

As the land shifts to the left, as viewed in Figure 3, the annular clearance between the surfaces of land 202 and another annular valve element 199 is reduced and the opening between the groove 210 and an annular groove 207, formed in the piston structure, is increased. Simultaneously, the clearance between the annular groove 210 and another annular groove 209, formed in the piston structure, is decreased and the annular clearance between the valve surfaces of land 204 and valve element 197 is increased. Accordingly, a substantial portion of the fluid entering the recess 194 will pass through the port 195, through passage 196 to the interior 198, and then through the clearance provided between land 204 and valve element 197 into another piston groove 208. Passages 211 interconnect the groove 208 and the working chamber 133. Also, the fluid within chamber 131 will be exhausted through axially extending passages 213 which communicate with another piston groove 206 and groove 207, into the annular groove 210, into a drain passage 205 which communicates with the hollow interior 141 of the tubular piston rod 140.

When the valve 146 is shifted to the right, as viewed in Figure 3, the clearance between the valve surface of land 204 and valve element 197 is reduced and the corresponding clearance between land 202 and element 199 is increased. Also, the opening between groove 209 and groove 210 is increased and the corresponding opening between groove 207 and groove 210 is decreased. Accordingly, a substantial portion of the fluid entering recess 194 will pass through port 195 and passage 196 into the space 198, through the passage 200, and then radially outward through the clearance between land 202 and valve element 199 into groove 206. A passage 213 interconnects the groove 206 and working chamber 131. Also, the fluid within chamber 133 will be free to exhaust through passages 211 which extend to grooves 208 and 209, through the opening between grooves 209 and 210, and then through the drain passage 205.

It will be noted that the valve elements 197 and 199 are each provided with axial passages which form a portion of the passages 211 and 213 respectively. The valve element 197 is also provided with radial passages which form extensions of passage 196 but which are angularly displaced from the above mentioned axial passages so as not to intersect the same.

In the actual physically constructed arrangement of the embodiment of the invention shown in Figure 3, the amount of the clearance in neutral position is made to be .005" at each side of each land of the valve.

In the operation of the embodiments of Figures 1–5, the valve rod 144 and the valve 146 can, by appropriate manual operation of the steering wheel 10 and steering shaft 99, be made to shift to the left, for instance, so as to at least partially cover the annular grooves 206 and 209 while relatively uncovering the annular grooves 207 and 208. Accordingly, a pressure build-up will occur in the annular grooves 208 and 209 and the working chamber 133 will be subjected to pump pressure and the pump pressure will be caused to increase accordingly. The annular grooves 206 and 207 connected to the opposite working chamber 131 will be opened to a greater degree to the drain passage 205, and the working cylinder 131 will be exposed only to the back pressure existing in the drain line 141 and in the drain chamber 124. Accordingly, a pressure differential will be created across the piston 134 and the piston will be caused to move to the left, as viewed in Figure 3.

On the other hand, when the valve-operating rod 144 and the valve 146 are caused to move to the right by appropriate motion of the steering shaft 99 and the steering wheel 10, a pressure buildup caused by an increasing pump pressure will occur in the annular grooves 206 and 207 communicating with the working chamber 131, and the working chamber 133 will be connected to a greater degree to the drain passages 205 and 141, thus resulting in a pressure differential which will cause the piston 134 to move to the right as viewed in Figure 3.

It is apparent that the hollow interior of the piston rod portion 96 will also be exposed to pump pressure in any operating position of the valve and accordingly the bore 165, the passage 166, and the space between the seals 163 will also be exposed to pump pressure. Thus in both the embodiment of Figure 3 and of Figure 4, the valve-operating rod 144 and the seal 164 will be exposed to the action of an unopposed fluid pressure at one side thereof tending to thrust the valve-operating rod 144 to the right with respect to the bore 165, and this action provides a false sense of hydraulic reaction which, though present only to a slight degree, subjects the actuator or nut portion 97 to a false sense of reaction by acting to assist the movement of the valve-operating rod 144 when the latter is being shifted to the right and by acting in opposition to the movement of the valve-operating rod 144 when the latter is being shifted to the left.

For example, as the hydraulic pressure in the hydraulic space between the seals 163 and 163' in the particular embodiment of Figure 4 tends to prevent relative movement of the seals in the lost motion joint toward each other when the tubular nut portion or actuator 97 is moved to the left, the hydraulic force acting on the piston rod 144 on the pressure side of the seal 164 acts in aid of the pressure force on the relatively smaller seal 163' (that is, the right hand seal, Fig. 4) to communicate a sense of hydraulic reaction through the appropriate lost motion element 158' to the driver of the vehicle, while opposing relative take-up in the lost motion joint 95. Also, when the tubular nut portion or actuator 97 is moved to the right in the embodiment of Figure 4, the hydraulic pressure drop across the seal 164 acts in opposition to the force exerted on the relatively large left hand seal 163 and the left hand lost motion element 158. However, since the left hand seal 163 is larger than the right hand seal 163', the difference in cross sectional areas may thus cancel out the hydraulic unbalance caused by the valve-operating rod 144 and the seal 164.

Although a certain amount of hydraulic unbalance may occur in the embodiment of Figure 3, it is contemplated that the magnitude of any unbalance will be of a relatively small magnitude. The rod 144 may be formed with a relatively small diameter since no appreciable resistance to movement is offered by the valve 146.

Since it is possible to form the rod 144 with a reduced diameter, it may be made flexible so as to prevent the valve 146 from binding.

Figure 6:
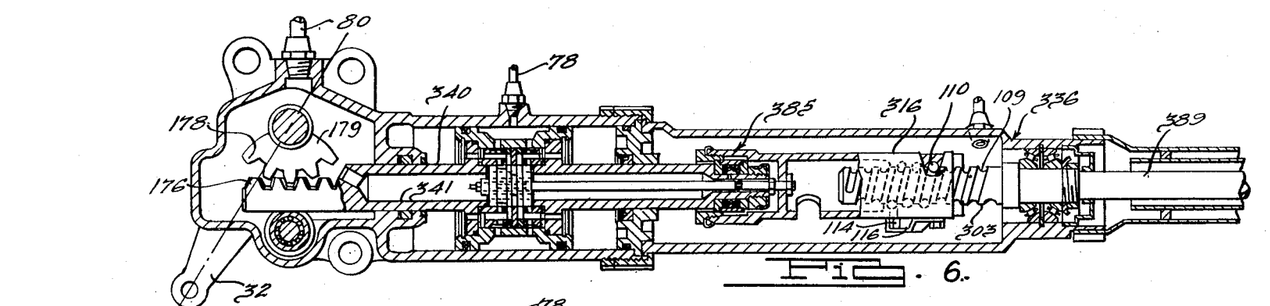
Figure 6 is a longitudinal sectional view of another modified form of the power steering unit of the vehicle in Figure 1.
Figure 7:
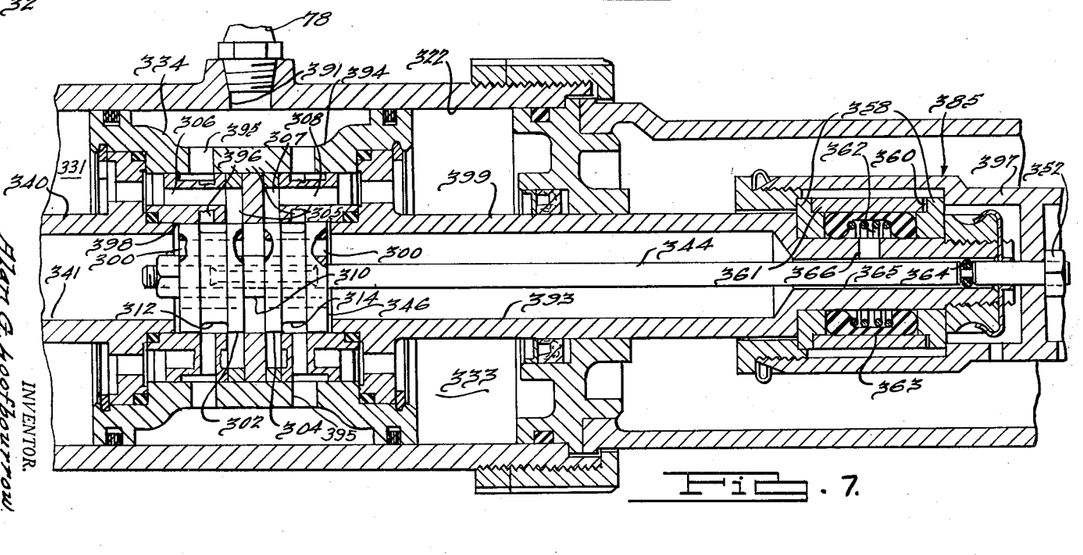
Figure 7 is an enlarged view of a portion of the power steering unit of Figure 6.
Figure 11:
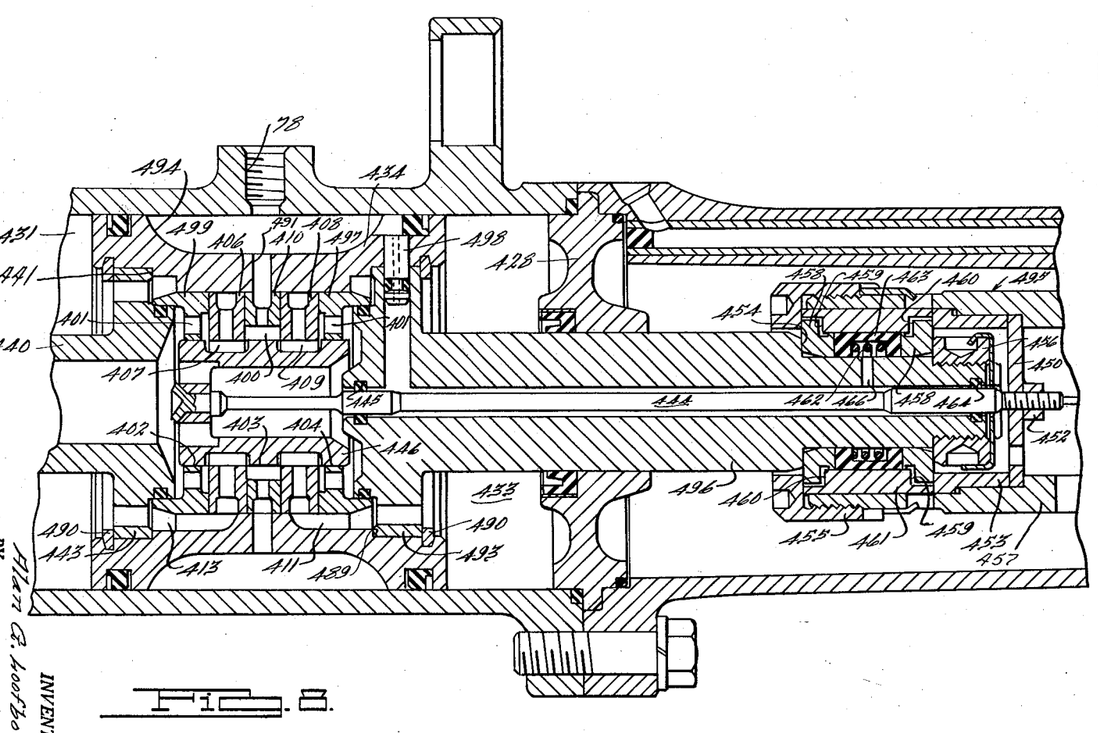

In the embodiment of the invention shown in Figures 6 and 7, a pressure movable piston member 334 is provided with a set of end structures respectively integrally incorporating a tubular piston rod 340 extending in one direction away from the piston 334 and a tubular piston rod portion 399 extending in the opposite direction from the piston. Each of the piston rods 340 and 399 has a hollow interior as generally indicated at 341 and 393 respectively. The piston 334 is provided with an annular recess or groove 394 having a plurality of ports 395 in the floor thereof. The groove 394 continuously communicates with a port 391 formed in the wall of a working cylinder 322 and is supplied by the high pressure fluid supply line 178. A plurality of radially extending passages 396, corresponding in number to the number of ports 395, establishes communication between the ports 395 and a hollow interior 398 formed within the piston 334.

A freely movable valve mechanism is slidably received in the hollow piston interior 398 and it comprises a spool-type valve 346 which is positively connected to a valve-operating rod 344 extending through the hollow interior 393 of the tubular piston rod portion 399. The valve 346 has a pair of spaced-apart lands 302 and 304 defining an intervening annular valve recess 310 which communicates with one or more drain passage 300 extending longitudinally through the valve 346. A pair of annular recesses 312 and 314 is formed toward the extremities of the valve 346 but these recesses are not as deep as the central recess 310 and they do not communicate with the drain passages 300.

In the central position of the valve 346, pressure fluid is caused to be introduced through ports 395 in the floor of the annular piston groove 394 and it then enters into the spaces defined by the valve recesses 312 and 314. When the valve 346 is moved to the right, as viewed in Figure 7, the annular opening between recess 312 and and an annular groove 305, which is formed in the piston, is increased. Also, the annular opening between groove 305 and recess 310 is decreased. Simultaneously, the annular opening between another annular groove 307 and recess 314 is decreased and the annular opening between groove 307 and recess 310 is increased.

When the valve 346 is moved in the left hand direction, as viewed in Figure 7, the annular openings between recess 310 and groove 305 and between recess 314 and groove 307 are increased in size and the annular openings between recess 312 and groove 305 and between recess 310 and groove 307 are decreased in size.

When the valve 346 assumes a central or neutral position, there is a slight clearance at both sides of the lands 302 and 304 between the grooves 305 and 307 respectively and the associated recesses in the valve 346. This clearance may be approximately .005 inch.

The central recess 310 is formed of sufficient depth to communicate with drain passages 300 which in turn communicate with the drain line 341 and the drain pipe 80.

The longitudinally extending drain passage 300 in the valve 346 is subjected only to the drain fluid back pressure and, accordingly, the hollow interior 393 of the piston rod portion 399 is subjected to this back pressure. A bore 365 of relatively reduced inside diameter formed in the rod portion 399 communicates with the hollow interior 393 and receives the valve-operating rod 344. One or more transversely extending radial passages 366 are provided in the reduced end of the tubular rod portion 399 to conduct the drain back pressure to the interior of a fluid-tight lost motion connection shown at 385.

The lost motion connection 385 is actuated by means of the steering shaft 389 in a manner similarly to the embodiments of the preceding Figures 1–5 to operate the worm and nut connection 303, 316 and to produce relative movement between the two-piece shaft containing the lost motion connection 385 and the one-piece shaft 389. The lost motion connection 385 incorporates a pair of lost motion elements 358 having an intervening spacer sleeve 361 and defining therewith a normally included lost motion gap or gaps 360. The inner surfaces of the lost motion elements 358 and the spacer sleeve 361 define a space in the form of a cylindrical volume of revolution having relatively movable walls at the respective ends thereof constituted by the plunger-like elements 358.

A substantially channel-shaped deformable seal 363 is disposed in the space between the lost motion elements 358 and has two lobes, one at each side, each of which presses against an adjacent lost motion element 358. The seal 363 is preferably formed of yieldable synthetic rubber, but may also be of an elastic plastic, resin, or other elastomeric material. A spring 362 may be provided which acts between the lobes of the seal 363 and thus provides a separating thrust against the lost motion elements 358.

The bore 365 at the end of the tubular piston rod portion 399 receives an O-type seal 364 which is carried by the end of the valve-operating rod 344 adjacent a lock nut 352 for the valve-operating rod. Inasmuch as the fluid in the communicating chambers defined by the bore 365, by the passage 366 and by the space within the seal 363 are exposed only to the back pressure of the drain 341 for the hydraulic system, these chambers are subjected only to a relatively light fluid pressure. Accordingly, the hydraulic unbalance across the seal 364 is of a relatively minor consequence. The sense of hydraulic feel in the embodiment of Figures 6 and 7 is proportional only to the back pressure existing in the system and hence is substantially constant and, as contrasted with the embodiments of the Figures 1–5 preceding, is not subject to pump pressure.

The operation of the specific embodiment of Figures 6 and 7 is as follows. When the operator of the vehicle turns the shaft 389 in a clockwise direction, the tubular nut portion 397 is caused to move to the right, as viewed in Figures 6 and 7, by virtue of the worm and nut connection 303, 316. This movement is transmitted to the rod portion 399 and piston 334 through the lost motion connection 385. By virtue of the lost motion provided at the gaps 360, the movement of the valve 346. Conseat the gaps 60, the movement of the piston 334 will slightly lag the movement of the valve 346. Consequently, the valve 346 will be silghtly displaced in the right hand direction with respect to the piston 334. A substantial portion of the fluid entering the recess 394 will therefore enter the recess 312 through passages 396 and then pass through the opening between recess 312 and groove 305. The fluid then enters the working chamber 331 through passage 306. Simultaneously, the fluid in chamber 333 is exhausted through passages 308 into groove 307. The fluid then passes through the annular opening between recess 310 and groove 307 into the drain passages 300.

Upon rotation of the shaft 389 in the opposite direction, the valve 346 is displaced to the left with respect to the piston 334. This will permit the high pressure fluid to pass into groove 314 through passage 396 and into groove 307 through the annular opening between groove 307 and recess 314. The fluid then passes into the working chamber 333. The fluid in chamber 331 is simultaneously exhausted through passage 306, groove 305, recess 310 and then through the drain passage 300.

The drain pressure is constantly in communication with the annular space between the lost motion elements 358 and it tends to oppose any relative movement between the shaft 399 and the rod 344. This opposition, which is due in part to the drain pressure and in part to the separating force of spring 362, provides a feel back sensation at the manually operated shaft 389.

Referring next to the embodiment of Figure 8, a tubular nut portion of a two-part axially disposed shaft is shown at 457. The end of the nut portion 457 threadably carries a nut 455 which has a shoulder portion contacting a spacer ring 461 which in turn contacts a second spacer ring 453 in end-to-end relationship. The spacer 453 is effective to secure a blank or plate 450 against a mating shoulder on the interior of the hollow nut portion 457.

A piston rod 496 is provided as shown with a reduced diameter end portion and a pair of lost motion elements is provided at 458 in surrounding relationship with respect to this end portion. One of the elements 458 is adapted to engage a shoulder 454 and the other element 458 is adapted to engage a nut 456 threadably carried by the extreme end of the rod 496. A lost motion gap 460 is provided between each of the elements 458 and separate shoulders 459 formed on the spacer ring 461.

A valve actuating rod 444 is axially disposed within a central bore in the piston rod 496 and is secured to the blank 450 by means of a nut 452. The rod 444 thereby forms an integral assembly with the nut portion 457.

The piston rod 496 slidably extends through an end partition 428 and is internally secured to a portion of a piston assembly 434 by means of a snap ring 490. A radial flange 493 may be integrally formed on the piston rod 496 and is secured between the snap ring 490 and a shoulder 489 formed within the piston 434.

A hollow shaft 440 is joined to the side of the piston 434 opposite the piston rod 496 and is internally secured similarly to the rod 496 and is coaxial therewith. The shaft 440 is also provided with a radial flange shown at 443 which is secured between another snap ring 490 and an internal shoulder 441.

A series of five circular valve elements are axially stacked within an axial bore within the piston 434 between the flanges 443 and 493 on the shaft 440 and piston rod 496 respectively. These valve elements are identified by numerals 499, 406, 410, 408 and 497. Each of the five valve elements is axially and centrally bored to slidably receive a spool-type valve element 446 having formed thereon the peripheral valve lands 402, 403, and 404 which cooperate with the aforementioned valve elements.

A pair of annular recesses are defined by the lands 402 and 403 and by the lands 403 and 404. Also, an annular recess is defined by the valve element 410 and the two adjacent valve elements 406 and 408. These three recesses are identified by the numerals 407, 409, and 400, respectively.

A passage 491 extends from the recess 400 radially outward through the valve element 410 into a peripheral cavity 494 formed about the piston 434 which communicates with the supply pipe attachment means 78.

The spool-type valve element 446 is hollow and the interior cavity thereof is adapted to communicate with the hollow interior of shaft 440 which, as in the previous embodiments, is in communication with a suitable drain passage. The interior cavity of the spool-type valve element 446 is also in fluid communication with axial passages 401 formed in each of the valve elements 499 and 497.

A series of passages 411 is adapted to provide fluid communication between a working chamber 433 and recess 409 through valve element 408, and another series of passages 413 is adapted to provide fluid communication between another working chamber 431 and the recess 407 through valve element 406.

The working chamber 431 is defined by one piston wall and another partition structure as in the previously described embodiments. The shaft 440 extends through the partition structure and carries a rack gear at the end thereof which operatively engages a gear segment as in the previous embodiments. The gear segment is operatively connected to the vehicle steering linkage.

The interior cavity of the spool-type element 446 and the hollow bore within the piston 434 is effectively sealed from the hollow axial bore within piston rod 496 by means of a fluid seal 445 which surrounds the valve actuating rod 444. Another seal is provided at 464 at the other end of the valve actuating rod 444 near the lost motion joint 495 previously described. A radial passage 498 extends from the peripheral cavity 494 to the axial bore within piston rod 496.

Radial passages 466 extend from the central bore in the piston rod 496 to the annular space defined by the lost motion elements 458 about the reduced diameter end of piston rod 496. A fluid sealing element 463 may be inserted within between the elements 458 to provide a fluid tight joint. A spring 462 may also be inserted between elements 458 to bias the same apart.

The operation of the embodiment of Figure 8 is as follows. Upon movement of the hollow nut portion 457 axially to the right the valve actuating rod 444 is also moved in the same direction by virtue of the integral connection between the same and the nut portion 457. This movement of nut portion 457 is accompanied by a decrease in the lost motion gap at the right side of spacer 461, the shoulder 459 on the element 461 moving closer to the one lost motion element 458. The axial motion of the nut portion 457 is thereafter transmitted to the piston rod 496 by virtue of the fluid connection between the same.

The relative axial movement which was caused to take place between the spool-type valve element 446 and the piston 434 by virtue of the lost motion joint 495 causes the clearances between element 408 and land 404, and between valve element 406 and land 403 to increase. Simultaneously, the clearances between element 408 and land 403 and between element 406 and land 402 are decreased. Thus, the fluid entering the cavity 494 from the source of supply is caused to pass through passage 491 into recess 400, then into recess 407 between the clearance space between land 403 and element 406 and then through the passages 413 to the working chamber 431. The fluid within chamber 433 may be exhausted through passages 411 leading to recess 409, then through the clearance space between element 408 and land 404 and then into the hollow interior of the spool-type valve element 446 which leads to the drain passage as previously explained.

Upon movement of the nut portion 457 in the opposite direction the spool-type valve element 446 becomes relatively displaced with respect to the piston so as to increase the clearance between land 403 and element 408 and between land 402 and element 406. Simultaneously, the clearance is decreased between land 404 and element 497 and between land 403 and element 406. Thus fluid from the cavity 494 is free to flow through passage 491 into recess 400 and then into recess 409 through the clearance space between element 408 and land 403. The fluid may then pass into the working chamber 433 through passages 411. Also, the fluid within the chamber 431 may be exhausted through the passages 413 which extend to recess 407, and then through the clearance space between land 402 and element 406 into passage 401. The fluid then passes to the interior to the spool-type valve element 446 and then to the drain.

It will be noted that the fluid pressure is caused to build up on either side of the piston 434 depending upon the direction of movement of the spool-type valve element 446.

This pressure buildup is transmitted to the central bore in the piston rod 496 by means of passage 498. The pressure buildup is then further transmitted through the axial bore within piston rod 496 and into the annular space enclosed by the sealing element 463 by means of passages 466. The fluid pressure within this annular space tends to bias the elements 458 away from each other thus tending to prevent the lost motion gaps 460 from being closed. This will further tend to prevent a relative axial movement of the spool-type valve element 446 with respect to the piston 434. This action provides a feel back or pressure reaction which must be overcome by the operator of the vehicle before any power assist may be obtained from the power steering unit.

In all of the previously described embodiments the lost motion gap in the respective lost motion joints is never completely closed except during those instances when extreme operating conditions prevail. It is apparent that during normal operating conditions, the spool-type valve element will assume some intermediate position with respect to the piston between the neutral position and an extreme displaced condition. The degree of restriction offered to the circulating fluid by the cooperating valve elements and valve lands is variable depending upon the amount the relative displacement between the spool-type valve element and the piston and the pressure buildup in the fluid working chambers varies accordingly.

It is evident that the invention herein disclosed will be equally effective in pressure fluid systems in which pressure fluid is continuously circulated at all times not only through the control valve, but also on past the control valve and through the working chambers at each end of the piston. Also the drawing shows three embodiments of an hydraulic steering arrangement which may be described as a combined proportional hydraulic and mechanical feel back system but it is not essential that mechanical feel back be employed or that the hydraulic feel back be necessarily utilized to offer a proportional feel to the system.

The sealed lost motion elements are shown to be normally separated and upon removal of slack in the lost motion connection they are moved relatively closer together. However, the seals may be so arranged as to cause the lost motion elements to be moved away from one another when the slack is taken up in the lost motion connection rather than toward one another as herein disclosed.

Variations within the spirit and scope of the invention described are equally comprehended by the foregoing description.

What is claimed is:

1. In combination, an element adapted to be moved to perform work, a manual actuator, a source of fluid pressure differing from atmosphere, a double acting passaged piston connected to said work performing element and having a hollow interior defining a valve chamber, mechanical connecting means between said manual actuator and said piston, a cylinder slidably receiving said double acting passaged piston and combining therewith to form a multi-chambered pressure-fluid motor by which power is directly applied to said work performing element for assisting said manual actuator, and valve means in said valve chamber constantly communicating with said source of fluid pressure and being connected to the manual actuator and being effective to control the inlet to and the exit of the fluid pressure from said source applied to and exhausted from the chambers of said motor, said mechanical connecting means including a lost motion-transmitting connection having a predetermined take-up clearance therein and being chambered to contact a pair of spaced apart movable walls disposed in opposition to one another and effective to yieldingly oppose the take-up of the aforesaid clearance in the motion-transmitting connection, said movable walls being exposed to fluid pressure corresponding to the pressure at the valve inlet thereby opposing take-up of the clearance in said motion-transmitting connection by offering increased resistance thereto when the resistance of said work performing element increases.

2. In combination, an element adapted to be moved to perform work, a manual actuator, a source of fluid pressure differing from atmosphere, a double acting passaged piston connected to said work performing element and having a hollow interior defining a valve chamber, mechanical connecting means between said manual actuator and said piston, a cylinder slidably receiving said double acting passaged piston and combining therewith to form a multi-chambered pressure-fluid motor by which power is directly applied to said work performing element for assisting said manual actuator, and valve means in said valve chamber constantly communicating with said source of fluid pressure and being connected to the manual actuator and being effective to control the inlet to and the exit of the fluid pressure applied to and exhausted from the chambers of said motor, said mechanical connecting means including a lost motion-transmitting connection having a predetermined take-up clearance therein and being chambered to contain a pair of spaced apart movable walls disposed in opposition to one another and effective to yieldingly oppose the take-up of the aforesaid clearance in the motion-transmitting connection joint, said movable walls being exposed to fluid pressure corresponding to the pressure at the valve chamber exit thereby opposing take-up of the clearance in said motion-transmitting connection joint by offering increased resistance thereto in proportion to the magnitude of said fluid pressure.

3. In combination, an element adapted to be moved to perform work, a manual actuator, a source of fluid pressure differing from atmosphere, a double acting passaged piston connected to said work performing element and having a hollow interior defining a valve chamber, mechanical connecting means between said manual actuator and said piston, a cylinder slidably receiving said double acting passaged piston and combining therewith to form a multi-chambered pressure-fluid motor by which power is directly applied to said work performing element for assisting said manual actuator, and valve means in said valve chamber constantly communicating with said source of fluid pressure and being connected to the manual actuator and being effective to control the inlet to and the exit of the fluid pressure from said source applied to and exhausted from the chambers of said motor, said mechanical connecting means including a lost motion-transmitting joint having a predetermined take-up clearance therein and being chambered to contain a pair of spaced apart movable walls disposed in opposition to one another and moving in the effective direction of movement of the joint as to be effective to yieldingly oppose the take-up of the aforesaid clearance in the joint, said movable walls being exposed to fluid pressure corresponding to the pressure at the valve inlet thereby opposing take-up of the clearance in said joint by offering increased resistance thereto when the resistance of said work performing element increases.

4. Pressure-fluid-supplied apparatus for moving an element to perform work comprising a toothed member drivingly enmeshed with said work performing element, means for operating said toothed member manually including a wheel and first and second threadably connected axially aligned shafts, one of said shafts being a longitudinal thrust transmitting shaft drivingly connected to said toothed member and being formed of multiple sections and having a spring-loaded lost motion connection between sections whereby relative movement occurs between sections in response to a predetermined thrust applied to said one shaft as occasioned by a predetermined torque applied to said wheel and other shaft, means for operating said toothed member by power including fluid motor means having a movable element connected to said toothed member and movable along a longitudinal axis coaxial with said axially aligned shafts, valve means disposed concentrically within the movable element of said motor means for controlling the delivery and the exhausting of fluid pressure to and from said motor means, said valve means having a valve inlet and outlet through which the pressure fluid passes and having an operative connection to said one shaft whereby said valve means is operable in response to the above described relative movement between the lost motion connected sections of said one shaft, said lost motion connection containing a fluid-tight chamber and having a pair of oppositely disposed movable walls therein, said walls being movable one in each direction of the relative movement aforesaid and being exposed to pressure corresponding to the fluid pressure at the valve inlet whereby increases of pressure on the fluid at the inlet of the valve means are utilized progressively to oppose said predetermined torque and the named relative movement tending to be produced thereby.

5. In a steering mechanism for a motor vehicle having a steering wheel and a steering gear connected to the steered wheels of the vehicle, a differential fluid pressure motor having means for connecting it to a source of pressure differential and forming a pathway for a stream of pressure fluid, a motion transmitting connection permitting limited relative movement of lost motion therein, said motor having a movable member connected to said motion transmitting connection and to said steering gear, and a motor-energizing follow-up control mechanism in said pathway comprising a pair of relatively movable elements one of which is operable by the steering wheel, said motion transmitting connection containing means constructed and arranged to be operative upon a motor-energizing relative movement of said elements for opposing relative movement of lost motion in said motion transmitting connection, said last-named means having inner surfaces defining a cylindrical path of revolution and provided with movable plungers at the ends thereof, and seal means forming therewith a fluid pressure responsive device subject to control by said elements.

6. In a steering mechanism for a motor vehicle having a steering wheel and a steering gear connected to the steered wheels of the vehicle, a differential fluid pressure motor having means for connecting it to a source of pressure differential and forming a pathway for a stream of pressure fluid, a motion transmitting connection permitting limited relative movement of lost motion therein, said motor having a movable member connected to said motion transmitting connection and to said steering gear, and a motor-energizing follow-up control mechanism in said pathway comprising a pair of relatively movable elements one of which is operable by the steering wheel, said motion transmitting connection containing means constructed and arranged to be operative upon a motor-energizing relative movement of said elements for opposing relative movement of lost motion in said motion transmitting connection, said last-named means having inner surfaces defining a cylindrical path of revolution and provided with movable plungers at the ends thereof, and seal means forming therewith a fluid pressure responsive device subject to control by said elements, said seal means each being of a general channel cross section having the base thereof engage a plunger and each of the opposite legs thereof engage said inner surface and being closely fitted in the end of the cylindrical path of revolution and having sufficient area exposed to the pressure therein to enable it to be urged by fluid pressure against said plunger and inner surfaces with sufficient force to form a slidable and substantially fluid tight joint therebetween.

7. In combination, a fluid motor cylinder, a wheel, first and second axially aligned shaft means, one of said shaft means being movable along its longitudinal axis concentrically with respect to said cylinder in response to torque applied to said wheel and containing a fluid-tight chamber susceptive to limited movement of relative collapse from a first undisturbed condition due to the application of said torque applied to said wheel, a piston containing valve means and being movable in said cylinder, said piston forming a chamber in each end of said cylinder and being connected for movement with said one shaft means, means through which fluid pressure is made available to said valve means including a passage and a port in said piston communicating with a port in said cylinder, means for establishing separate communication passages between said valve means and the chambers in said cylinder, means for adjusting said valve means to apply and to exhaust fluid pressure from said cylinder chambers selectively including an operating element connected to said valve means and being movable in correspondence with the limited movement of relative collapse of said fluid-tight chamber, and means for introducing the applied fluid pressure to the relatively collapsible fluid-tight chamber including a series of passages and a port in the piston communicating with said port in the cylinder, said pressure fluid thereby being utilized to oppose relative collapse of said fluid tight chamber caused by wheel torque application and being progressively effective to restore the same to said first position following each disturbance thereof in correspondence to the magnitude of fluid pressure being made available to the valve means and applied thereby to the cylinder chambers.

8. The combination according to claim 7, in which said fluid-tight chamber incorporates two opposed spaced apart walls of different areas and being moved a corresponding limited amount toward one another upon relative collapse of said fluid tight chamber.

9. A fluid pressure power mechanism comprising a double-acting differential fluid pressure motor having a pressure movable member therein and first and second tubular piston rods connected to such member and extending in opposite directions therefrom, a power transmitting connection carried by said first piston rod externally of said motor for moving an element to perform work, a freely movable follow-up valve means within said motor, first passages leading from a source of fluid pressure to said pressure movable member and second passages for leading a stream of exhausted pressure fluid away from said pressure movable member, said first and second passages each including a portion of said valve means therein for controlling the application of fluid pressure to the pressure movable member in said motor and being exhausted therefrom for applying driving power to said work performing element, an operating rod connected to said valve means and extending through said second piston rod, an actuator member arranged in axial alignment with said piston rods and being directly connected to said valve operating rod, and means affording a lost-motion thrust transmitting connection between said actuator member and one of said rods to transmit through the latter, equally in either direction of movement thereof, a thrust to said power transmitting connection to move said work performing element in the event of a failure of power in said motor, said last-named means having a hollow interior defining a fluid tight chamber and containing movable walls therein, said movable walls being formed with unequal lateral areas exposed to fluid pressure corresponding to the working pressure effective in said first and second passages thereby individually and respectively opposing the take-up of lost motion in said connection as the same is moved in either axial direction by offering increased resistance thereto when the resistance of said work performing element increases.

10. Pressure-fluid-supplied apparatus for moving an element to perform work comprising a toothed member drivingly enmeshed with said work performing element, means for operating said toothed member manually including a wheel and first and second threadably connected axially aligned shafts, one of said shafts being a longitudinal thrust transmitting shaft drivingly connected to said toothed member and being formed of multiple sections and having a spring-loaded lost motion connection between sections whereby relative movement occurs between sections in response to a predetermined thrust applied to said one shaft as occasioned by a predetermined torque applied to said wheel and other shaft, means for operating said toothed member by power including fluid motor means having a movable element connected to said toothed member and movable along a longitudinal axis coaxial with said axially aligned shafts, valve means concentrically within the movable element of said motor means for controlling the applying and exhausting of fluid pressure to and from said motor means, said valve means having a valve inlet and outlet through which the pressure fluid passes and having an operative connection to said one shaft whereby said valve means is operable in response to the above described relative movement between the lost motion connected sections of said one shaft, said lost motion connection containing a fluid-tight chamber and having a pair of oppositely disposed movable walls therein, said walls being movable one in each direction of the relative movement aforesaid and being exposed to pressure corresponding to the fluid pressure at the valve outlet whereby increases in pressure of the fluid at the outlet of the valve means are utilized to oppose said predetermined torque and the named relative movement tending to be produced thereby.

11. In combination, an element adapted to be moved to perform work, a manual actuator, a source of fluid pressure differing from atmosphere, a double acting passaged piston connected to said work performing element and having a hollow interior defining a valve chamber, mechanical connecting means between said manual actuator and said piston, a cylinder slidably receiving said double acting passaged piston and combining therewith to form a multi-chambered pressure-fluid motor by which power is directly applied to said work performing element for assisting said manual actuator, valve means in said valve chamber constantly communicating with said source of fluid pressure and being connected to the manual actuator and being effective to control the inlet to and the exit of the fluid pressure from said source applied to and exhausted from the chambers of said motor, said mechanical connecting means including a lost motion-transmitting joint having a predetermined take-up clearance therein and being chambered to contain a pair of spaced apart movable walls disposed in opposition to one another and effective yieldingly to oppose the take-up of the aforesaid clearance in the motion-transmitting joint, said movable walls being spring biased and exposed to fluid pressure corresponding to the pressure at the valve inlet whereby to oppose take-up of the clearance in said joint by offering mechanically biased and hydraulically provided resistance thereto.

12. In combination, an element adapted to be moved to perform work, a manual actuator, a source of fluid pressure differing from atmosphere, a double acting passaged piston connected to said work performing element and having a hollow interior defining a valve chamber, mechanical connecting means between said manual actuator and said piston, a cylinder slidably receiving said double acting passaged piston and combining therewith to form a multi-chambered pressure-fluid motor by which power is directly applied to said work performing element for assisting said manual actuator, valve means in said valve chamber constantly communicating with said source of fluid pressure and being connected to the manual actuator and being effective to control the inlet to and the exit of the fluid pressure from said source applied to and exhausted from the chambers of said motor, said mechanical connecting means including a lost motion-transmitting connection having a predetermined take-up clearance therein and being chambered to contain a pair of spaced apart movable walls disposed in opposition to one another and effective yieldingly to oppose the take-up of the aforesaid clearance in the motion transmitting connection, said movable walls being exposed to fluid pressure corresponding to the pressure at the valve inlet whereby to oppose take-up of the clearance in said connection by offering hydraulically provided resistance thereto.

13. In a power boosting mechanism, a fluid working cylinder, a movable piston within said working cylinder defining a pair of opposed working chambers, a personally operable driving member, a control valve disposed within said piston including a first valve portion securely retained within said piston and a second relatively movable valve portion slidably disposed within said piston, a driven member operatively connected to said piston, a piston rod secured to said piston, a lost motion connection between said driving member and said piston rod, passage means including portions partly defined by said control valve for admitting hydraulic working fluid into one of said working chambers and for simultaneously exhausting fluid from the other of said working chambers, said second valve portion being connected to said driving member and actuated thereby to selectively control the distribution of hydraulic fluid pressure to each of said working chambers within said working cylinder, said lost motion connection including one portion engageable by said driving member and another portion engageable by said piston rod when said driving member is moved in one direction, the movement of said driving member being accompanied by a relative movement between said portions of said lost motion connection, and means for subjecting said last-named portions to hydraulic pressure to resist said relative movement.

14. The combination as set forth in claim 13 wherein said lost motion connection includes a mechanical spring means for exerting a spring force upon said portions of said lost motion connection to supplement the resistance to relative movement therebetween provided by said hydraulic pressure.

15. In a power boosting mechanism, a fluid working cylinder, a movable piston within said working cylinder defining a pair of opposed working chambers, a personally operable driving member, a control valve disposed within said piston including a first valve portion securely retained within said piston and also including a second relatively movable valve portion slidably disposed within said piston, a driven element operatively connected to said piston, a piston rod member secured to said piston, a lost motion connection between said driving member and said piston rod member, passage means including portions partly defined by said control valve for admitting hydraulic working fluid into one of said working chambers and for simultaneously exhausting fluid from the other of said working chambers, said second valve portion being connected to said driving member and actuated thereby to selectively control the distribution of hydraulic fluid pressure to each of said working chambers within said working cylinder, said lost motion connection including pressure reaction elements carried by one of said members, one of said reaction elements being engageable with the other member and movable therewith, said other member being adapted to move between two limiting relative positions with respect to said one member, and hydraulic means for biasing said reaction elements in opposed directions to urge said members toward a neutral position intermediate said two limiting positions.

16. In a power boosting mechanism, a fluid working cylinder, a movable piston within said working cylinder defining a pair of opposed working chambers, a personally operable driving member, a control valve disposed within said piston including a first valve portion securely retained within said piston and a second relatively movable valve portion slidably disposed within said portion, a driven member operatively connected to said piston, a piston rod secured to said piston, a lost motion connection between said driving member and said piston rod, passage means including portions partly defined by said control valve for admitting hydraulic working fluid into one of said working chambers and for simultaneously exhausting fluid from the other of said working chambers, said second valve portion being connected to said driving member and actuated thereby to selectively control the distribution of hydraulic fluid pressure to each of said working chambers within said working cylinder, said lost motion connection including one portion engageable by said driving member and another portion engageable by said piston rod when said driving member is moved relative to said piston rod toward one relative limiting position, the other portion of said lost motion connection being engageable by said driving member and said one portion of said lost motion connection being engageable by said piston rod when said driving member is moved relative to said piston rod toward another relative limiting position, and means for subjecting said portions of said lost motion connection to fluid pressure to normally bias said piston rod and driving member toward a neutral relative position intermediate said limiting positions.

17. In a power boosting mechanism including a fluid motor, said fluid motor having a fluid pressure operated member, a driven member secured to said pressure operated member, a shaft secured to said pressure operated member, passage means for transmitting fluid under pressure to either of opposed sides of said pressure operated member, a control valve disposed in said pressure operated member including relatively movable valve elements partly defining said passage means, said valve elements selectively controlling the delivery of pressurized fluid to one of said opposed sides while simultaneously controlling the exhausting of fluid from the other of said opposed sides, a driving member, a lost motion connection between said shaft and said driving member, one of said relatively movable valve elements being positively connected to said driving member, said lost motion connection including adjustable lost motion elements engageable with said shaft and said driving member, said lost motion elements accommodating a relative movement between said driving member and said shaft within two extreme limiting relative positions, and hydraulic pressure responsive means for normally biasing said lost motion elements in opposite directions thereby urging said shaft and said driving member toward a relative neutral position intermediate said two limiting relative position.

18. In a power boosting mechanism including a fluid motor, said fluid motor having a fluid pressure operated member, a driven member secured to said pressure operated member, a shaft secured to said pressure operated member, passage means for transmitting fluid under pressure to either of opposed sides of said pressure operated member, a control valve disposed in said pressure operated member including relatively movable valve elements partly defining said passage means, said valve elements selectively controlling the delivery of pressurized fluid to one of said opposed sides while simultaneously controlling the exhausting of fluid from the other of said opposed sides, a driving member, a lost motion connection between said shaft and said driving member, one of said relatively movable valve elements being positively connected to said driving member, said lost motion connection comprising a pair of axially spaced pressure reaction elements positioned on said shaft, first shoulder means formed on said shaft adapted to operatively engage said reaction elements, other shoulder means formed on said driven member adapted to engage these same reaction elements, a pressure reaction chamber partly defined by said spaced reaction elements, passage means formed at least in part in said shaft for conducting pressurized working fluid into said reaction chamber for opposing relative motion between said reaction elements and between said driving member and said shaft upon actuation of said driving member.

19. In a power boosting mechanism a fluid working cylinder, a movable piston within said working cylinder defining a pair of opposed working chambers, a personally operable driving member, a control valve disposed within said piston including a first valve portion securely retained within said piston and a second relatively movable valve portion slidably disposed within said piston, a driven member operatively connected to said piston, a piston rod secured to said piston, a lost motion connection between said driving member and said piston rod, passage means including portions partly defined by said control valve for admitting hydraulic working fluid into one of said working chambers and for simultaneously exhausting fluid from the other of said working chambers, said second valve portion being connected to said driving member and actuated thereby to selectively control the distribution of hydraulic fluid pressure to each of said working chambers within said working cylinder, said lost motion connection including one portion engageable by said driving member and another portion engageable by said piston rod when said driving member is moved in one direction, the movement of said driving member being accompanied by a relative movement between said lost motion connection portions, and other passage means defined in part by said piston rod for subjecting said lost motion connection portions to the hydraulic pressure of said working fluid to resist said relative movement, the resistance to said relative movement being proportional in magnitude to the resistance offered by said driven member.

20. In a power boosting mechanism a fluid working cylinder, a movable piston within said working cylinder defining a pair of opposed working chambers, a personally operable driving member, a control valve disposed within said piston including a first valve portion securely retained within said piston, a driven element operatively connected to said piston, a piston rod member secured to said piston, a lost motion connection between said driving member and said piston rod member, passage means including portions partly defined by said control valve for admitting hydraulic working fluid into one of said working chambers and for simultaneously exhausting fluid from the other of said working chambers, a second movable valve portion registering with said first valve portion said second valve portion being connected to said driving member and actuated thereby to selectively control the distribution of hydraulic fluid pressure to each of said working chambers within said working cylinder, said lost motion connection including pressure reaction elements carried by one of said members, said reaction elements being engageable with the other member and movable therewith, said other member being adapted to move between two limiting relative positions with respect to said one member, and other passage means defined in part by said piston rod member for conducting fluid pressure from said working cylinder into the vicinity of said reaction elements for biasing the latter toward a neutral position intermediate said two limiting positions.

21. In a power boosting mechanism including a fluid motor, said fluid motor having a movable fluid pressure operated member, a driven member operatively connected to said pressure operated member, a first shaft secured to said pressure operated member, a driving shaft, a lost motion connection between said shafts including spaced pressure reaction elements engageable with each of said shafts, said pressure reaction elements being relatively movable with respect to each other upon movement of one shaft with respect to the other, and passage means defined in part by one of said shafts and communicating with a high pressure region of said fluid motor for subjecting said pressure reaction elements to fluid pressure to resist relative movement between the same and between said shafts, the magnitude of the resistance to said relative movement being proportional to the resistance offered by said driven member to a driven movement.

22. In a power boosting mechanism including a fluid motor, said fluid motor having a fluid pressure operating member, a driven member secured to said pressure operated member, a shaft secured to said pressure operated member, passage means for transmitting fluid under pressure to either of opposed sides of said pressure operating member, a control valve disposed in said pressure operated member including relatively movable valve elements partly defining said passage means, said valve elements selectively controlling the delivery of pressurized fluid to one of said opposed sides, a driving member, a lost motion connection between said shaft and said driving member, one of said movable valve elements being positively connected to said driving member, said lost motion connection including adjustable lost motion elements engageable with said shaft and said driving member, said lost motion elements accommodating a relative movement between said driving member and said shaft within two extreme limiting relative positions, and hydraulic pressure responsive means including a fluid passage interconnecting said fluid motor and said lost motion connection for normally biasing said lost motion elements in opposite directions thereby urging said shaft and said driving member toward a relative neutral position intermediate said two limiting relative positions with a force which is proportional in magnitude to the pressure of said pressurized fluid on said one opposed side of said pressure operated member.

23. In a power boosting mechanism, a fluid working chamber, a movable piston within said working chamber, a manually actuated member, a control valve disposed within said piston, a valve actuator rod interconnecting said manually actuated member and one portion of said control valve, a piston rod secured to said piston at one end thereof, a lost motion connection between said manually actuated member and said piston rod, said control valve including another valve portion secured within said piston, a passage means for transmitting hydraulic working fluid into said piston to said valve portions, other passage means extending from said valve portions to either side of said piston, said one and said other valve portion being relatively movable to control the passage of working fluid therethrough and through said other passage means to either side of said piston in response to movement of said manually actuated member, said lost motion connection containing a pair of relatively movable elements spaced with respect to each other to define a pressure chamber therebetween, one of said pair being engageable with said manually actuated member, another of said pair being engageable with said piston rod, and passage means for conducting working fluid pressure to said pressure chamber.

24. A power boosting mechanism comprising a fluid chamber, a double acting piston within said chamber, a piston rod extending from said piston, a control valve means within said piston, passage means for conducting working fluid from a fluid pressure source to a portion of said valve means within said piston, passage means extending from said valve means to either side of said piston, said control valve means having a pair of relatively movable valve elements for selectively controlling the passage of fluid from said fluid pressure source to said chamber on either side of said piston, a lost motion connection between said piston rod and one of said relatively movable valve elements, the other of said relatively movable valve elements being fixed with respect to said piston, and means for opposing the lost motion of said lost motion connection thereby causing a corresponding resistance to the actuation of said valve elements, said resistance being proportional to the magnitude of the working fluid pressure.

25. A power boosting mechanism as set forth in claim 24 wherein said lost motion connection includes a pair of relatively movable lost motion elements defining at least one pressure chamber adjacent thereto, one of said movable lost motion elements being operatively engaged by said piston rod, a manually actuated member joined to said one valve element, the other of said movable lost motion elements being operatively engaged by said manually actuated member, a spring means for opposing relative motion of said movable lost motion elements, and means for conducting working pressure to said pressure chamber to supplement the function of said spring means.

26. In a steering mechanism for a motor vehicle having a steering wheel and a steering gear connected to the steered wheels of the vehicle, a differential fluid pressure motor having means for connecting it to a source of pressure differential and forming a pathway for a stream of pressure fluid, a motion-transmitting connection permitting limited relative movement of lost motion therein comprising a pair of relatively shiftable reaction members, said motor having movable means operatively connected to one of said members and to said steering gear for shifting thereof, and a motor-energizing follow-up control valve mechanism in said pathway comprising a pair of relatively movable valve elements, means operated by said steering wheel and operatively connected to one of said valve elements and to the other of said reaction members for shifting thereof, said reaction members being relatively shiftable to effect limited relative lost motion movement of the last-named means and said movable means with respect to each other between two limiting positions, and hydraulic means cooperable with said reaction members to bias the same in opposed directions to urge said last-named means and movable means toward a neutral position between said two limiting positions.

27. The combination according to claim 13 and said passage means being normally open to accommodate the continuous circulation of fluid through each of the opposed working chambers, and said valve portions being relatively movable to vary the degree of restriction of the continuous circulation through each portion of said passage means.

28. The combination according to claim 17 and said valve elements defining in part a normally open fluid connection between said fluid pressure source and each side of said pressure operated member to accommodate a continuous circulation of fluid through said fluid motor.

29. A power boosting mechanism comprising a fluid chamber, a double acting piston within said chamber, a piston rod extending from said piston, a control valve means within said piston, a normally open passage means including one portion for conducting working fluid from a fluid pressure source to said valve means within said piston and another portion extending from said valve means to each side of said piston, said control valve means having a pair of relatively movable valve elements for selectively controlling the passage of fluid from said fluid pressure source to one side of said piston while simultaneously controlling the exhausting of fluid from the other side of said piston, said valve elements defining in part a normally open fluid connection between said fluid pressure source in each side of said piston to accommodate a continuous circulation of fluid through said fluid chamber, a lost motion connection between said piston rod and one of said relatively movable valve elements, the other of said relatively movable valve elements being fixed with respect to said piston, and means for opposing the lost motion of said lost motion connection thereby causing a corresponding resistance to the actuation of said valve elements, said resistance being proportional to the magnitude of the working fluid pressure.

References Cited in the file of this patent
UNITED STATES PATENTS

| | | |
|---|---|---|
| 1,878,944 | Lombard | Sept. 20, 1932 |
| 1,937,470 | Davis | Nov. 28, 1933 |
| 2,393,585 | Boynton | Jan. 29, 1946 |
| 2,560,813 | Nelson | July 17, 1951 |
| 2,608,263 | Garrison | Aug. 26, 1952 |

U. S. DEPARTMENT OF COMMERCE
PATENT OFFICE

CERTIFICATE OF CORRECTION

Patent No. 2,837,167  Alan G. Loofbourrow  June 3, 1958

It is hereby certified that error appears in the printed specification of the above numbered patent requiring correction and that the said Letters Patent should read as corrected below.

Column 6, line 47, for "very" read -- every --; column 11, lines 41 and 42, strike out "of the value 346. Conse- at the gaps 60, the movement"; line 44, for "silghtly" read -- slightly --; column 14, line 58, for "contact" read -- contain --; column 20, line 38, for "position" read -- positions --.

Signed and sealed this 5th day of August 1958.

(SEAL)

Attest:
KARL H. AXLINE
Attesting Officer

ROBERT C. WATSON
Commissioner of Patents